(12) United States Patent
Lee et al.

(10) Patent No.: US 12,501,735 B2
(45) Date of Patent: Dec. 16, 2025

(54) SOLAR MODULE LIFTING APPARATUS AND SOLAR MODULE DISASSEMBLING APPARATUS COMPRISING THEREOF

(71) Applicant: Won Kwang S&T Co., Ltd., Incheon (KR)

(72) Inventors: Sang Hun Lee, Incheon (KR); Jun Kee Kim, Seoul (KR); Tae Eun Lee, Incheon (KR); Cheong Min Noh, Incheon (KR); Geun Sik Cho, Incheon (KR); Su Hyon Eom, Incheon (KR)

(73) Assignee: Won Kwang S&T Co., Ltd., Incheon (KR)

( * ) Notice: Subject to any disclaimer, the term of this patent is extended or adjusted under 35 U.S.C. 154(b) by 1077 days.

(21) Appl. No.: 17/519,660

(22) Filed: Nov. 5, 2021

(65) Prior Publication Data

US 2023/0051182 A1 Feb. 16, 2023

(30) Foreign Application Priority Data

Aug. 10, 2021 (KR) .................. 10-2021-0105654

(51) Int. Cl.
| | |
|---|---|
| *H02S 20/30* | (2014.01) |
| *B09B 3/00* | (2022.01) |
| *B09B 3/30* | (2022.01) |
| *B65G 67/04* | (2006.01) |
| *B66F 9/065* | (2006.01) |

(Continued)

(52) U.S. Cl.
CPC .............. *H10F 71/00* (2025.01); *B09B 3/00* (2013.01); *B09B 3/30* (2022.01); *B65G 67/04* (2013.01); *B66F 9/0655* (2013.01); *G05B 19/4155* (2013.01); *H02S 20/30* (2014.12); *H10F 19/80* (2025.01); *G05B 2219/40034* (2013.01); *H02S 30/10* (2014.12); *Y02E 10/50* (2013.01);

(Continued)

(58) Field of Classification Search
CPC . H10F 71/00; H10F 19/80; B09B 3/00; B09B 3/30; B09B 2101/15; B65G 67/04; B66F 9/0655; G05B 19/4155; G05B 2219/40034; H02S 20/30; H02S 30/10; Y02E 10/50; Y02W 30/20; Y02W 30/52; Y02W 30/82; Y02W 30/62
See application file for complete search history.

(56) References Cited

FOREIGN PATENT DOCUMENTS

| JP | H05-319163 A | 12/1993 |
|---|---|---|
| KR | 10-2010-0046326 A | 5/2010 |

(Continued)

*Primary Examiner* — Ryan J. Walters
(74) *Attorney, Agent, or Firm* — The PL Law Group, PLLC

(57) ABSTRACT

A solar module lifting apparatus includes a base supported on the ground, a cylinder module including cylinder units disposed on the base and changing in height by contracting and stretching, and a rotary supply plate having one side supporting a solar module and the other side coupled to the cylinder module and moving up and down the solar module by operation of the cylinder module, in which the rotary supply plate includes a first hinge and a second hinge spaced apart from each other on the other side, the cylinder module includes a first cylinder unit and a second cylinder unit of which the upper ends are coupled to the first hinge and the second hinge by shafts, respectively, and at least one of the height and the inclination of the rotary supply plate is adjusted by contracting or stretching of the first cylinder unit and the second cylinder unit.

6 Claims, 8 Drawing Sheets

(51) Int. Cl.
*G05B 19/4155* (2006.01)
*H10F 19/80* (2025.01)
*H10F 71/00* (2025.01)
*H02S 30/10* (2014.01)

(52) U.S. Cl.
CPC ............. *Y02W 30/20* (2015.05); *Y02W 30/52* (2015.05); *Y02W 30/82* (2015.05)

(56) References Cited

FOREIGN PATENT DOCUMENTS

| | | | |
|---|---|---|---|
| KR | 20100046326 A | * | 7/2010 |
| KR | 10-2037120 B1 | | 10/2019 |
| KR | 10-2020-0034100 A | | 3/2020 |
| KR | 10-2154030 B1 | | 9/2020 |
| KR | 10-2020-0142457 A | | 12/2020 |
| KR | 10-2185429 B1 | | 12/2020 |
| KR | 10-2021-0083721 A | | 7/2021 |

* cited by examiner

SOLAR MODULE LIFTING APPARATUS AND SOLAR MODULE DISASSEMBLING APPARATUS COMPRISING THEREOF

GOVERNMENT LICENSE RIGHTS

This invention was made with government support under National Research and Development Project (Project identification No. 1485017207, Project Serial No. 2020003100003, Research Administration Authority: Korea Environmental Industry & Technology Institute (KEITI), Research Program Name: R&D Project for recyclability of non-recyclable products, Research Project Name: Development of technology for collecting, shattering and recycling-recovery of valuable materials from end of life photovoltaic panel, Contribution Rate: 100%, and Period of Research: May 21, 2020 to Dec. 31, 2022) awarded by Korea Ministry of Environment (MOE). The government has certain rights in the invention.

CROSS-REFERENCE TO RELATED APPLICATION(S)

This application claims the benefit under 35 USC § 119(a) of Korean Patent Application No. 10-2021-0105654, filed on Aug. 10, 2021, in the Korean Intellectual Property Office, the entire disclosure of which is incorporated herein by reference for all purposes.

BACKGROUND

1. Field of the Invention

The present disclosure relates to a solar module lifting apparatus that carries a solar module between two points having different heights, and a solar module disassembling apparatus including same. In detail, the present disclosure relates to a solar module lifting apparatus that improves convenience of carrying by changing both of a height and an inclination, and a solar module disassembling apparatus including the solar module lifting apparatus.

2. Description of the Related Art

The development of clean energy that reduces environment pollution is being accelerated. Development of clean energy is in progress in various ways including national support projects. Clean energy technology variously includes not only a technology of managing produced power such as energy management, delivery, and storage, but a renewable energy technology that uses biomass, etc. Solar photovoltaic power generation, wind power generation, etc. that generate power using natural force without using the fossil fuel have been continuously studied as power production technologies.

In particular, solar photovoltaic power generation has been remarkably improved in power generation efficiency through continuous improvement of the technology since development, and accordingly, it is considered as a spotlighted alternative energy technology even at present. Solar photovoltaic power generation facilities are continuously increasing because there is the advantage that they can be easily applied even to places where conventional power generation facilities, etc. are difficult to install, they hardly cause environmental damage, and it is possible to use existing buildings, facilities, etc. when installing them.

However, a solar photovoltaic power generation facility also has a problem with maintenance because a solar cell has to be replaced and discarded when its lifespan is ended. In particular, as not only the number, but the application unit or area of solar photovoltaic power generation facilities are increased, it is required to replace and discard solar cells in large quantities. However, most solar photovoltaic power generation facilities are aggregate of photovoltaic modules formed by combining a solar cell in a frame. Further, since photovoltaic modules have a structure in which a glass plate, etc. are stacked, they are difficult to simply discard, which is a considerable problem in management of solar photovoltaic power generation facilities in a large scale.

In such discarding, etc., there is a problem, which needs improvement, that it is difficult to appropriately supply solar modules to a process line. For example, most common conveyers or roller are used to horizontally move objects, but, depending on situations, it may be difficult to apply a conveyer etc. because a process line is positioned higher than the ground, it may be required to change the arrangement of solar modules in accordance with the stacked state, or the ground may not be even (e.g., when disposal is immediately performed at outdoors where a solar photovoltaic power generation facility is positioned), so problems may be generated when solar modules are supplied or carried. Therefore, there is a need for measures against these problems.

SUMMARY

In order to solve the problems, an objective of the present disclosure is to provide to a solar module lifting apparatus that carries a solar module between two points having different heights, particularly, a solar module lifting apparatus that improves convenience of carrying by changing both of a height and an inclination. Another objective of the present disclosure is to smoothly dispose waste solar modules by providing a solar module disassembling apparatus including the solar module lifting apparatus.

The object of the present disclosure is not limited to those described above, and other objects may be made apparent to those skilled in the art from the following description.

A solar module lifting apparatus according to the present disclosure includes: a base configured to be supported on the ground; a cylinder module including a plurality of cylinder units that is disposed on the base and changes in height by contracting and stretching; and a rotary supply plate having one side that supports a solar module and the other side that is coupled to the cylinder module and moving up and down the solar module by operation of the cylinder module, in which the rotary supply plate includes a first hinge and a second hinge spaced apart from each other on the other side, the cylinder module includes a first cylinder unit and a second cylinder unit of which the upper ends are coupled to the first hinge and the second hinge by shafts, respectively, and at least one of the height and the inclination of the rotary supply plate is adjusted by contracting or stretching of the first cylinder unit and the second cylinder unit.

The rotary supply plate may be rotated and simultaneously moved up by operation of the cylinder module from a first arrangement in which the rotary supply plate is inclined with the first hinge lower than the second hinge to a second arrangement in which the first hinge is not lower than the second hinge.

The center of gravity of the rotary supply plate may be positioned between the first hinge and the second hinge, and the first cylinder unit and the second cylinder unit may change the heights of the first hinge and the second hinge in opposite directions.

A contracting-stretching distance of the first cylinder unit may be larger than a contracting-stretching distance of the second cylinder unit.

The second cylinder unit may be positioned higher than the first cylinder unit from the ground.

The rotary supply plate may further have a holding step protruding perpendicularly to the rotary supply plate from the lowermost end of the rotary supply plate in the first arrangement.

At least one of the first cylinder unit and the second cylinder unit may be coupled to the base by a shaft, so the inclination thereof may change.

The base may include a leveling module configured to change a reference position of the cylinder module by changing the gap between a top and a bottom.

A solar module disassembling apparatus according to the present disclosure includes: the solar module lifting apparatus of the present disclosure; and a solar module disassembling unit that is supplied with a solar module from the solar module lifting apparatus and disassembles the solar module into parts including a glass plate included in the solar module, a stacked film having a solar cell stacked on the glass plate, and a frame surrounding a module body comprised of the glass plate and the stacked film, in which the solar module disassembling unit includes: a frame separator including a frame separation blade that presses and separates the frame from the module body, receiving the solar module from one side, separating the frame, and discharging the module body from the other side; and a disassembler including a scraper that scrapes the stacked film from the glass plate, receiving the module body from one side, and disassembling and discharging the module body into the stacked film and the glass plate.

The solar module disassembling unit may further include a movable container unit configured to be moved with the frame separator and the disassembler therein, and the solar module lifting apparatus may move up and supply the solar module into the movable container unit at the outside of the movable container unit.

The movable container unit may have a plurality of floors therein, and the solar module lifting apparatus may move up and supply the solar module onto any one of the floors.

DETAILED DESCRIPTION

Figure 1:
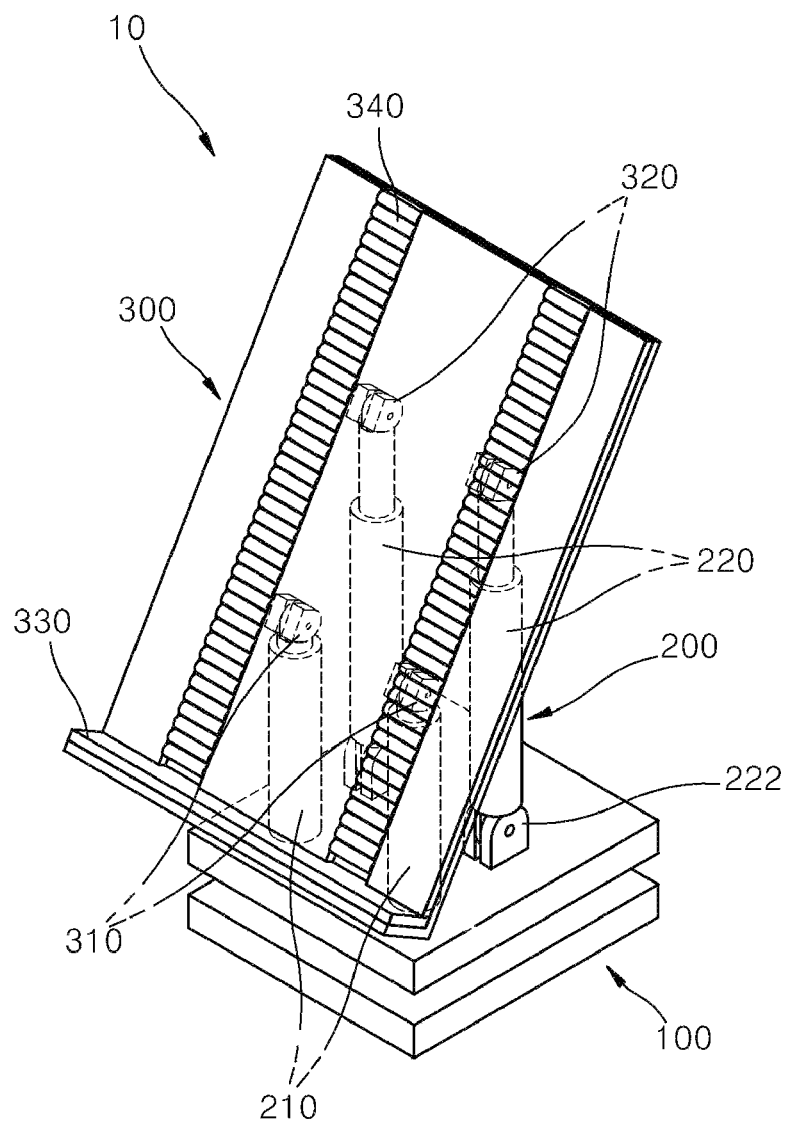
FIG. 1 is a perspective view of a solar module lifting apparatus according to an embodiment of the present disclosure.

The advantages and features of the present disclosure, and methods of achieving them will be clear by referring to the exemplary embodiments that will be described hereafter in detail with reference to the accompanying drawings. However, the present disclosure is not limited to the exemplary embodiments described hereafter and may be implemented in various ways, and the exemplary embodiments are provided to complete the description of the present disclosure and let those skilled in the art completely know the scope of the present disclosure and the present disclosure is defined by claims. Like reference numerals indicate the same components throughout the specification.

A solar module lifting apparatus according to the present disclosure and a solar module disassembling apparatus including the solar module lifting apparatus are described hereafter in detail with reference to FIGS. 1 to 9. For brief and clear description, a solar module lifting apparatus according to the present disclosure is described first in detail with reference to FIGS. 1 to 5, and then a solar module disassembling apparatus according to the present disclosure is described with reference to FIGS. 1 to 9 on the basis of the description of the solar module lifting apparatus.

Figure 2:
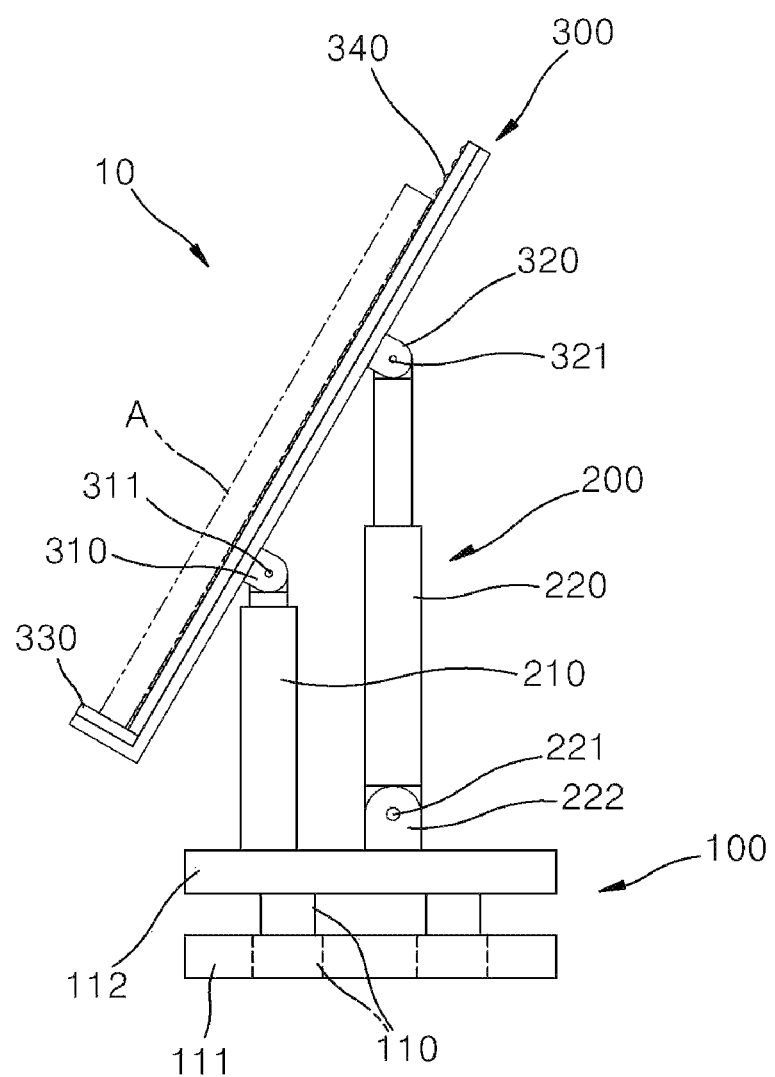
FIG. 2 is a side view showing a first arrangement of the solar module lifting apparatus shown in FIG. 1.
Figure 3:
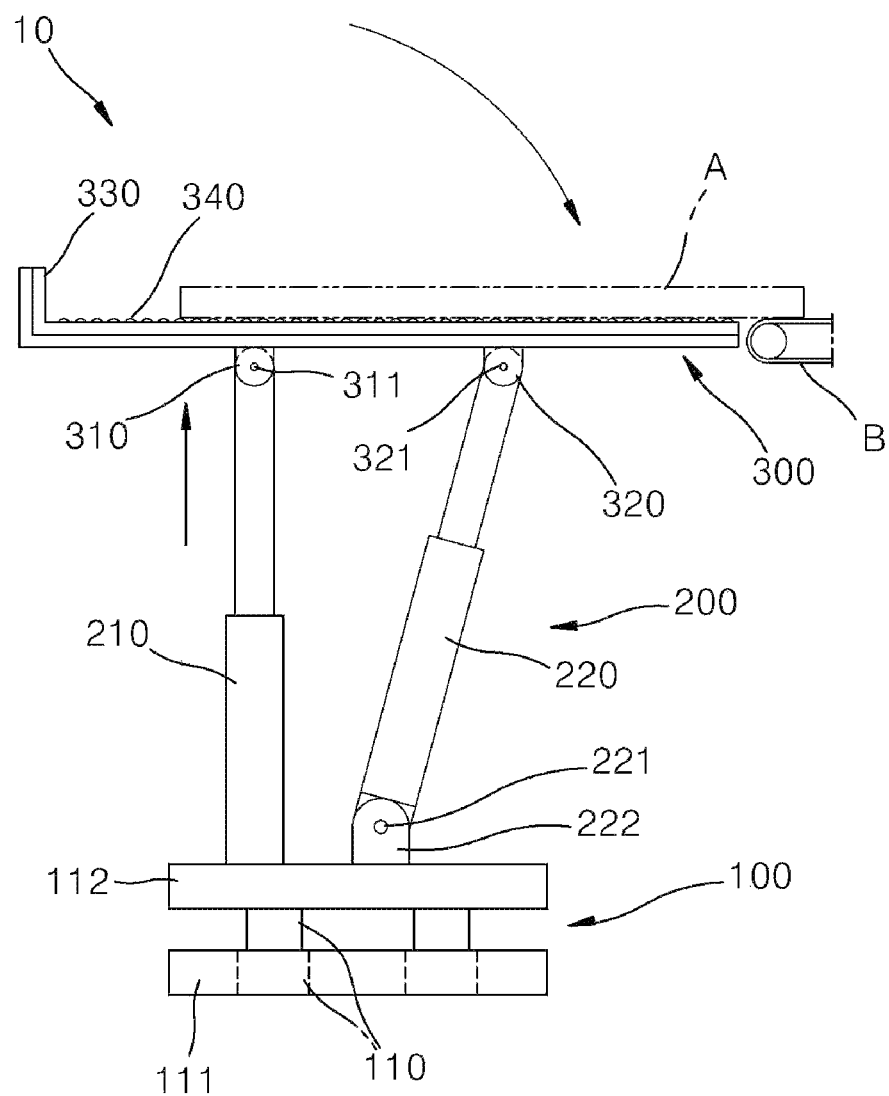
FIG. 3 is a side view showing a second arrangement of the solar module lifting apparatus shown in FIG. 1.

FIG. 1 is a perspective view of a solar module lifting apparatus according to an embodiment of the present disclosure, FIG. 2 is a side view showing a first arrangement of the solar module lifting apparatus shown in FIG. 1, and FIG. 3 is a side view showing a second arrangement of the solar module lifting apparatus shown in FIG. 1.

Referring to FIGS. 1 to 3, a solar module lifting apparatus 10 according to the present disclosure can simultaneously change the height and inclination of a rotary supply plate 300 by operating a cylinder module 200. The rotary supply plate 300 has two hinges coupled to different cylinder units, respectively, whereby the rotary supply plate 300 can move in various ways as the cylinder units contract and stretch. In particular, the rotary supply plate 300, as shown in FIG. 2, is inclined to a side when it is moved down, so a solar module A can be easily loaded (since the bottom is erect, placing is convenient, and it is stably supported on the inclined bottom after placing). Further, when moved up, as shown in FIG. 3, the rotary supply plate 300 is horizontally positioned while the height and inclination are changed together, so the solar module A can be immediately transferred onto a conveyer B horizontally disposed at a predetermined height. Accordingly, the solar module A can be very conveniently supplied to a process line having a large height difference from the ground. The process line is not necessarily limited thereto, and for example, it may be a line for performing disposal of waste solar modules, etc.

The solar module lifting apparatus 10 of the present disclosure is configured as follows. The solar module lifting apparatus 10 includes: a base 100 configured to be supported on the ground; a cylinder module 200 including a plurality of cylinder units that is disposed on the base 100 and changes in height by contracting and stretching; and a rotary supply plate 300 having one side that supports a solar module (see A in FIGS. 2 and 3) and the other side that is coupled to the cylinder module 200, and moving up and down the solar module by operation of the cylinder module 200. The rotary supply plate 300 includes a first hinge 310 and a second hinge 320 spaced apart from each other on the other side, the cylinder module 200 includes a first cylinder unit 210 and a second cylinder unit 220 of which the upper ends are coupled to the first hinge 310 and the second hinge 320 by shafts 311 and 321, respectively. At least one of the height and the inclination of the rotary supply plate 300 is adjusted by contracting or stretching of the first cylinder unit 210 and the second cylinder unit 220. The first hinge, second hinge, first cylinder unit, and second cylinder unit are named so that two different hinges and two different cylinder units can be distinguished, respectively, without limiting the present disclosure. Hereafter, the configuration, operation effects, etc. of the solar module lifting apparatus 10 are described in more detail with reference to an embodiment of the present disclosure.

Referring to FIGS. 1 to 3, the base 100 is disposed at the lowermost part of the solar module lifting apparatus 10 and supported on the ground. Other components of the solar module lifting apparatus 10 are disposed on the base 100. The base 100 may have a bottom that comes in contact with the ground, or if necessary, may have another support structure that is in contact with the bottom. Though not shown, another support structure such as a support or a movable support structure such as wheels may be freely applied. The base 100 may be formed to have various structures that can be supported on the ground. Preferably, the base 100 may have a structure like a laterally wide plate or a rectangular block not to fall down even if the center of gravity of the upper part changes. For example, the base may include a top plate 112 and a bottom plate 111, and a leveling module 110 (see FIGS. 2 and 3) that adjusts the gap between the top plate 112 and the bottom plate 111 may be disposed between the top plate 112 and the bottom plate 111.

That is, in an embodiment of the present disclosure, the base 100 may include a leveling module 110 that adjusts the reference position of the cylinder module 200 thereon by changing the gap between the upper end and the lower end thereof. The leveling module 110, for example, may be comprised of one or, two or more cylinders disposed in parallel with each other. As the leveling module 110 contracts and stretches, the gap between the top plate 112 and the bottom plate 111 can be changed, and accordingly, the height of the top plate 112 from the ground is changed, whereby the height (which may be the reference position) of the cylinder module 200 from the ground can be changed. Therefore, using the leveling module 110, it is possible to change the heights of the cylinder module 200 and the rotary supply plate 300 coupled to the cylinder module 200 to be described below so that the rotary supply plate 300 can be operated at various heights. The leveling module 110 is not necessarily limited to a cylinder structure, etc., and may be formed in various stretchable structures. For example, when it is required to increase the gap between the lower end and the upper end, a multi-stage cylinder may be used, and it is possible to change the gap between the lower end and the upper end by a required amount using other stretchable structures. Accordingly, it is possible to more smoothly carry solar modules even between two points having a relatively large height difference (see FIGS. 6, 7, etc.)

The cylinder module 200 is disposed on the base 100. The cylinder module 200 includes a plurality of cylinder units that changes in height by contracting and stretching. The cylinder units include a first cylinder unit 210 and a second cylinder unit 220, and the first cylinder unit 210 and the second cylinder unit 220 are respectively connected to a first hinge 310 and a second hinge 320 that are spaced apart from each other on the rotary supply plate 300. As in the present embodiment, a plurality of first cylinder units 210 may be arranged in parallel with each other and operated substantially in the same way, and a plurality of second cylinder units 220 may also be arranged in parallel with each other and operated substantially in the same way. That is, as shown in FIG. 1, the first cylinder unit 210 and the second cylinder unit 220 each may be provided in plurality. Further, in correspondence to this configuration, the first hinge 310 and the second hinge 320 each may also be provided in plurality. The relative positions and disposed structures of the first cylinder unit 210 and the second cylinder unit 220 and the relative positions and disposed structures of the first hinge 310 and the second hinge 320 are more clearly seen from the side views of FIGS. 2 and 3. The cylinder units of the cylinder module 200, for example, each may include a cylinder body and a piston inserted in the cylinder body and moving through the cylinder body, and may be changed in length by the piston that is stretched or contracted by hydraulic pressure. Accordingly, when the length of a cylinder unit is adjusted by a piston that stretches and contracts up and down, the upper end of the cylinder unit may have the same meaning as the upper end of the piston.

The rotary supply plate 300 has one side supporting a solar module A (see FIGS. 2 and 3) and the opposite other side coupled to the cylinder module 200. Accordingly, as described above, when the cylinder module 200 is operated, a solar module can be moved up and down (see FIGS. 2, 3, etc.). In detail, the rotary supply plate 300 includes a first hinge 310 and a second hinge 320 that are spaced apart from each other on the other side (i.e., the side coupled to the cylinder module). Referring to FIGS. 2 and 3, the first hinge 310 and the second hinge 320 may be spaced apart from each other at two sides with the center of gravity of the rotary plate 300 therebetween (e.g., in a plate-shaped structure that is long in one direction as in the present embodiment, the center of gravity may be positioned substantially at the center of the longitudinal direction). Accordingly, the supporting force by the cylinder unit is uniformly transmitted to the rotary supply plate 300 at two sides of the center of gravity, thereby being able to keep the balance of the rotary supply plate 300. Further, it may also be possible to change the inclination while minimizing a change of the center of gravity by inversing the heights of the two sides with respect to the center of gravity of the rotary supply plate 300.

The upper ends of the first cylinder unit 210 and the second cylinder unit 200 described above are coupled to the first hinge 310 and the second hinge 320 by the shafts 311 and 321, respectively, whereby the relative positions of the first hinge 310 and the second hinge 320 can be variously changed. Accordingly, the height and inclination of the entire rotary supply plate 300 are changed. That is, the cylinder module 200 includes a first cylinder unit and a second cylinder unit of which the upper ends are coupled to the first hinge 310 and the second hinge 320 by the shafts 311 and 321, respectively, whereby as the first cylinder unit 210 and the second cylinder unit 220 contract and stretch, at least any one of the height and inclination of the rotary supply plate 300 can be adjusted. As in an embodiment of the present disclosure, at least any one of the first cylinder unit 210 and the second cylinder unit 220 is coupled to the base 100 by a shaft 221, whereby the inclination thereof can be changed. Accordingly, it is possible to correspond to the change of the gap between the cylinder units due to rotation of the rotary supply plate 300 (see FIGS. 2 and 3).

For example, as in the present embodiment, the first cylinder unit 210 may be vertically fixed on the base 100 and the second cylinder unit 220 may be coupled to the level block 222 disposed on the base 100 by the shaft 221 such that the lower end can be rotated. Since the cylinder units are connected to different points on the rotary supply plate 300, when the rotary supply plate 300 is rotated, the gap between the two connection points (e.g., the positions of the hinges) seen from the base 100 can be changed. Accordingly, the arrangement of the cylinder units is also supposed to be changed. According to this structure, it is possible to deal with the gap change between the cylinder units due to rotation of the rotary supply plate 300 and to maintain the entire structure. However, the present disclosure is not limited thereto, and if necessary, the first cylinder unit 210 may be configured to move or both of the first cylinder unit 210 and the second cylinder unit 220 may be configured to move, that is, it is possible to deal with the gap change using other structures. It is possible to support a rotary member such as the rotary supply plate 300 with a cylinder unit, using several possible structures.

The first cylinder unit 210 and the second cylinder unit 220 may be disposed to have different heights. In the case that the rotary supply plate 300 inclines downward to the first cylinder unit 210 when moving down (see FIG. 2), as in the present embodiment, it is preferable that the second cylinder unit 220 is disposed higher than the first cylinder unit 210 from the ground so that inclination is formed. For example, the height of the top of the base 100 is made asymmetric by coupling the level block 222 described above to the top of the base 100 and the second cylinder unit 220 is coupled to the level block 222, whereby the second cylinder unit 220 can be disposed higher than the first cylinder unit 210 from the ground. Hereafter, the operation of the rotary supply plate 300, and relevant structural characteristics, operation effects, etc. are described in more detail based on an embodiment of the present disclosure.

First, the configuration related to up-down movement and rotation of the present disclosure is described with reference to FIGS. 2 and 3. The rotary supply plate 300 of the present disclosure can be rotated and simultaneously moved up by operation of the cylinder module 200 from a first arrangement in which the rotary supply plate 300 is inclined with the first hinge lower than the second hinge 320, as shown in FIG. 2, to a second arrangement in which the first hinge 310 is not lower than the second hinge 320. Accordingly, when the rotary supply plate 300 is moved down, it can be set to be inclined at a side, and when moved up, the inclination can be greatly changed to be horizontal, etc. That is, when the rotary supply plate 300 is moved down, the arrangement is automatically changed to be inclined, and when the rotary supply plate 300 is moved up, the arrangement can be automatically changed again to be horizontal, etc. (not limited to horizontal direction). Up-down movement of the rotary supply plate 300 may mean a vertical change of the center of gravity, and the inclination change of the rotary supply plate 300 may mean rotation of the rotary supply plate 300 with respect to the center of gravity. The rotary supply plate 300 can be operated in these ways by contracting and stretching of the first cylinder unit 210 and the second cylinder unit 220.

Accordingly, the solar module lifting apparatus 10 receives a solar module A from the ground and supports the solar module A at an angle, as shown in FIG. 2, and then moves up while rotating, as shown in FIG. 3, thereby being able to supply the solar module A to a destination with the direction of the solar module A changed to horizontal direction, etc. Accordingly, even if a conveyer B is installed horizontally, etc. at a relative high position, it is possible to very appropriately supply the solar module A into the conveyer B. Preferably, it is possible to install conveying rollers 340, etc. (see FIG. 1) on the side of the rotary supply plate 300 which supports the solar module A and receive and discharge the solar module A. Further, a holding step 330 is formed at an end of one side of the rotary supply plate 300, whereby it is possible to support the edge of the solar module A at normal times and also possible to prevent separation of the solar module A due to a centrifugal force when the rotary supply plate 300 is rotated. The holding step 330, for example, may protrude perpendicularly to the rotary supply plate 300 from the lowermost end of the rotary supply plate 300 in the first arrangement, as shown in FIG. 2.

Accordingly, while the rotary supply plate 300 is moved up and rotated, as shown in FIGS. 2 and 3, for example, the heights of the first hinge 310 and the second hinge 320 can be changed in opposite directions by the first cylinder unit 210 and the second cylinder unit 220. That is, as described above, the center of gravity of the rotary supply plate 300 is positioned between the first hinge 310 and the second hinge 320, and the first cylinder unit 210 and the second cylinder unit 220 can change the heights of the first hinge 310 and the second hinge 320 in opposite directions. Accordingly, it is possible to control the rotary supply plate 300 such that the center of gravity is not rapidly changed, and it is also possible to move up and rotate the rotary supply plate 300 while relatively minimizing the change of the center of gravity. Accordingly, it is possible to keep movement of the rotary supply plate 30 as stable as possible, whereby it is possible to more stably carry the solar module A loaded on the rotary supply plate 300. However, if the height changes of the first hinge 310 and the second hinge 320 are completely symmetric, the actual effect of moving up rotary supply plate 300 may be reduced or may be hardly generated. Accordingly, preferably, the contracting-stretching distances of the first cylinder unit 210 and the second cylinder unit 220 may be made asymmetric.

For example, the contracting-stretching distance of the first cylinder unit 210 may be larger than the contracting-stretching distance of the second cylinder unit 220, and accordingly, it is possible to more easily perform the operation of changing from the first arrangement shown in FIG. 2 to the second arrangement shown in FIG. 3 or vice versa. As described above, it is possible to move up/down and rotate the rotary supply plate 300 at the same time while operating the first cylinder unit 210 and the second cylinder unit 220. In the present embodiment, the first arrangement is exemplified in FIG. 2 and the second arrangement is exemplified in FIG. 3, but the inclination of the rotary supply plate at the first arrangement 300 is not limited, and for example, the inclination may be changed to be larger or smaller. Further, the second arrangement of the rotary supply plate 300 is also not limited to the horizontal direction, so, for example, the first hinge 310 may be further moved up such that the rotary supply plate 300 is inclined slightly downward at the second hinge 320. The rotary supply plate 300 can be moved up/down and rotated at the same time.

Figure 4:
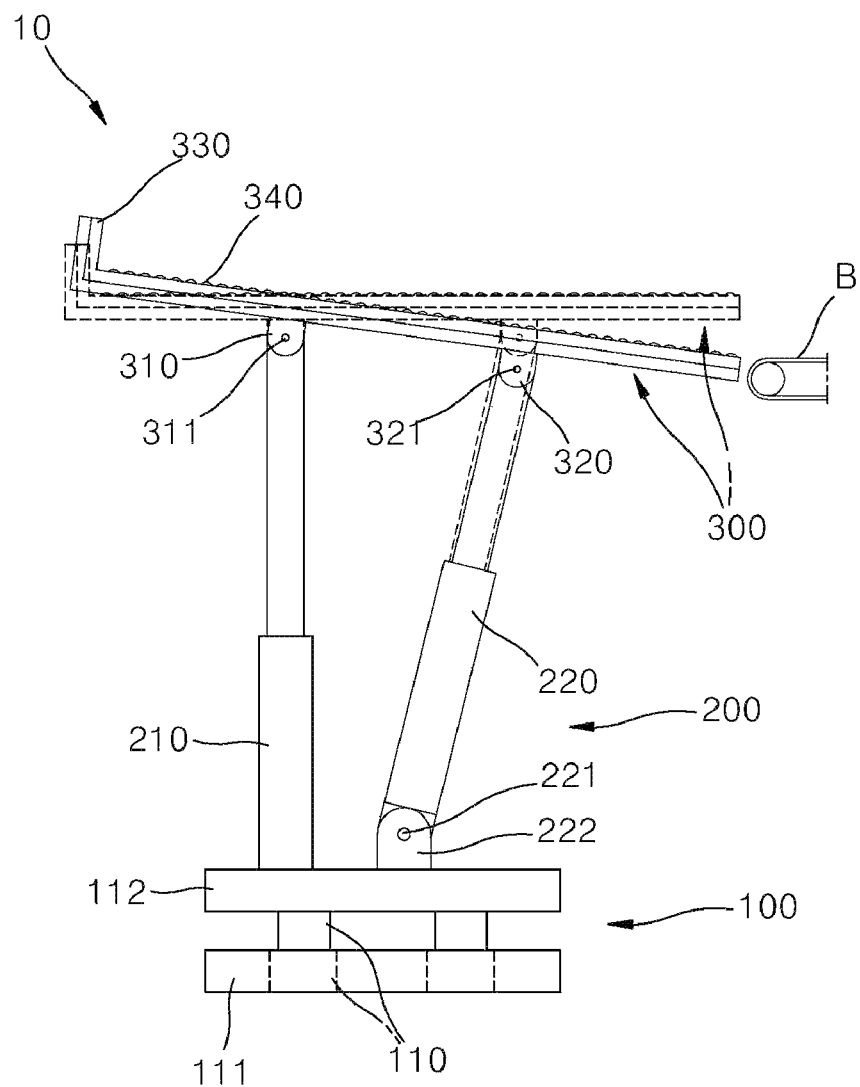
FIGS. 4 and 5 are views exemplifying other operations of the solar module lifting apparatus shown in FIG. 1.
Figure 5:
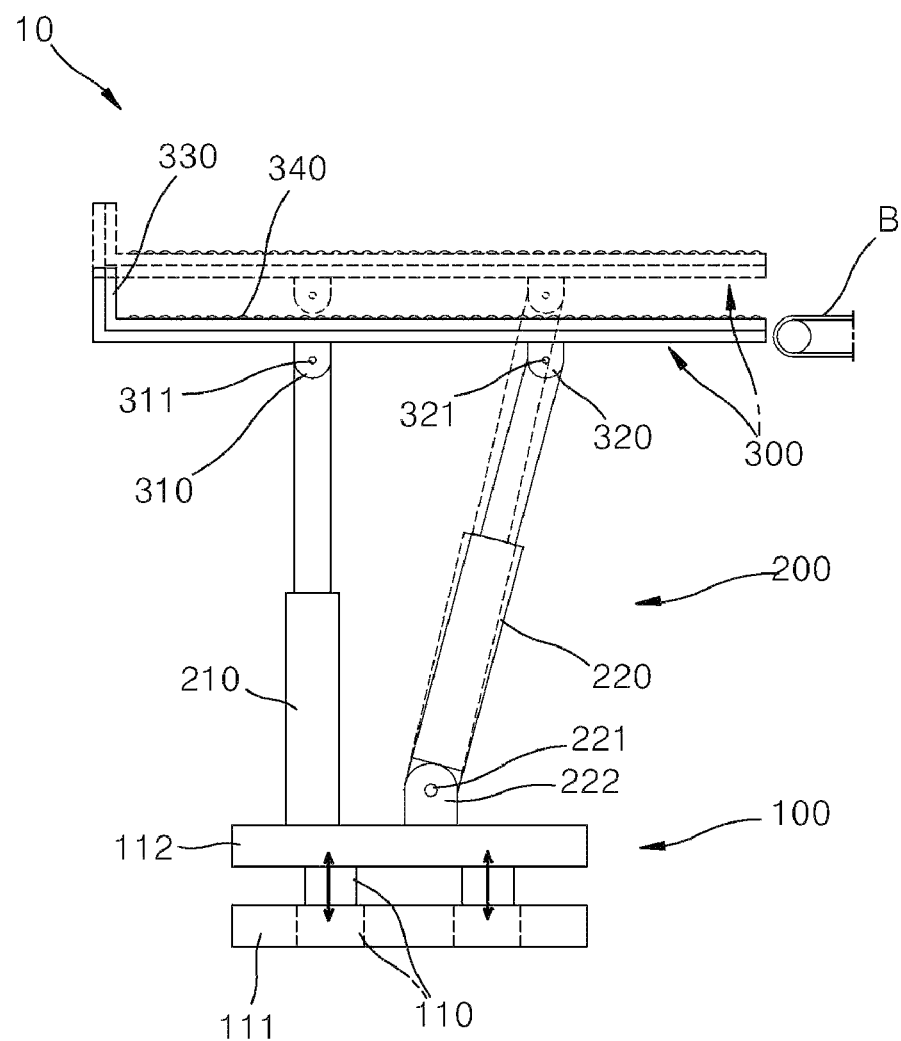

FIGS. 4 and 5 are views exemplifying other operations of the solar module lifting apparatus shown in FIG. 1.

However, the present disclosure is not limited thereto and the rotary supply plate 300 may be operated in various other ways. For example, as shown in FIG. 4, it is possible to partially change the inclination even after moving up the rotary supply plate 300 by contracting and stretching the first cylinder unit 210 and the second cylinder unit 220. Accordingly, it is possible to deal with the case in which several conveyers B are arranged or the position of a conveyer B is changed. Further, as shown in FIG. 5, two cylinder units may be contracted and stretched in the same direction, and accordingly, only the height of the rotary supply plate 300 may be changed in at least a predetermined section. Further, since it is possible to change the height using the base 100 by operating the leveling module 110 described above, it is possible to carry solar modules at various heights by combining the operation of the cylinder units and the operation of the leveling module 110. Using such solar module lifting apparatus 10, it is possible to conveniently supply waste solar modules to a disposal process while disassembling the solar modules into parts, etc.

Hereafter, a solar module disassembling apparatus according to the present disclosure is described in detail with reference to FIGS. 6 to 9. Since the solar module lifting apparatus of the present disclosure was described above, the above description is referred to for the solar module lifting apparatus, and differences are mainly described.

Figure 6:
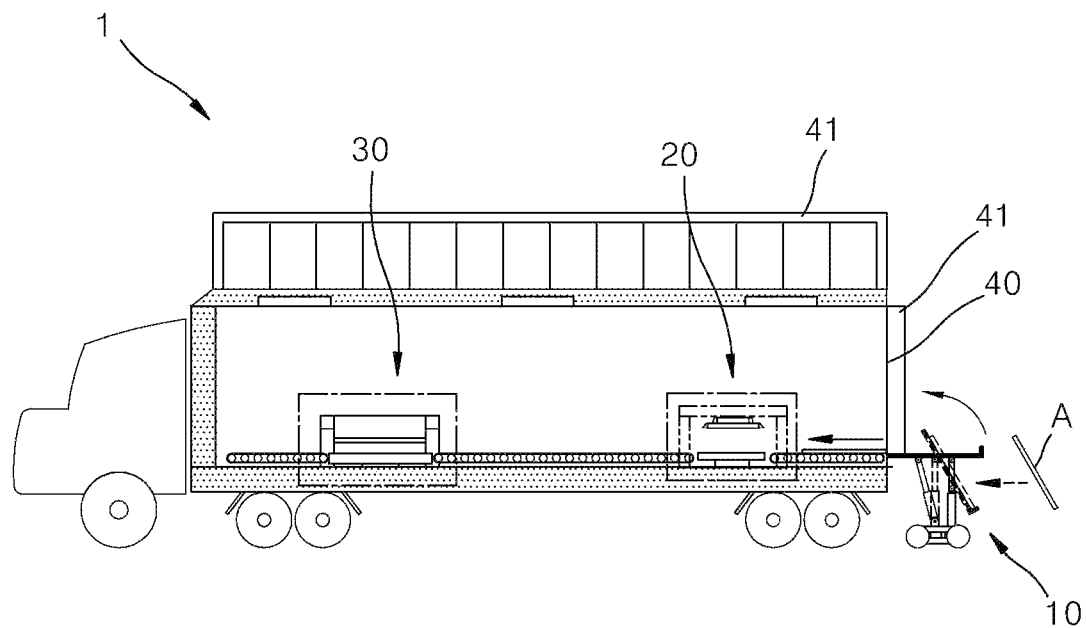
FIG. 6 is a conceptual diagram of a solar module disassembling apparatus according to an embodiment of the present disclosure.
Figure 7:
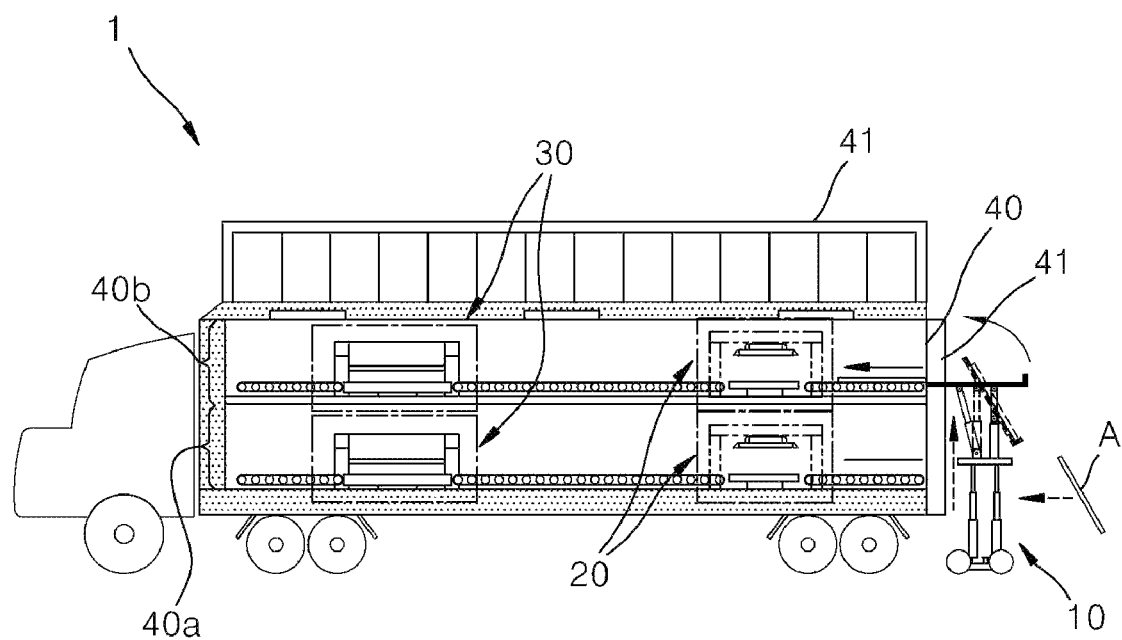
FIG. 7 is a view showing a modification of the solar module disassembling apparatus shown in FIG. 6.
Figure 8:
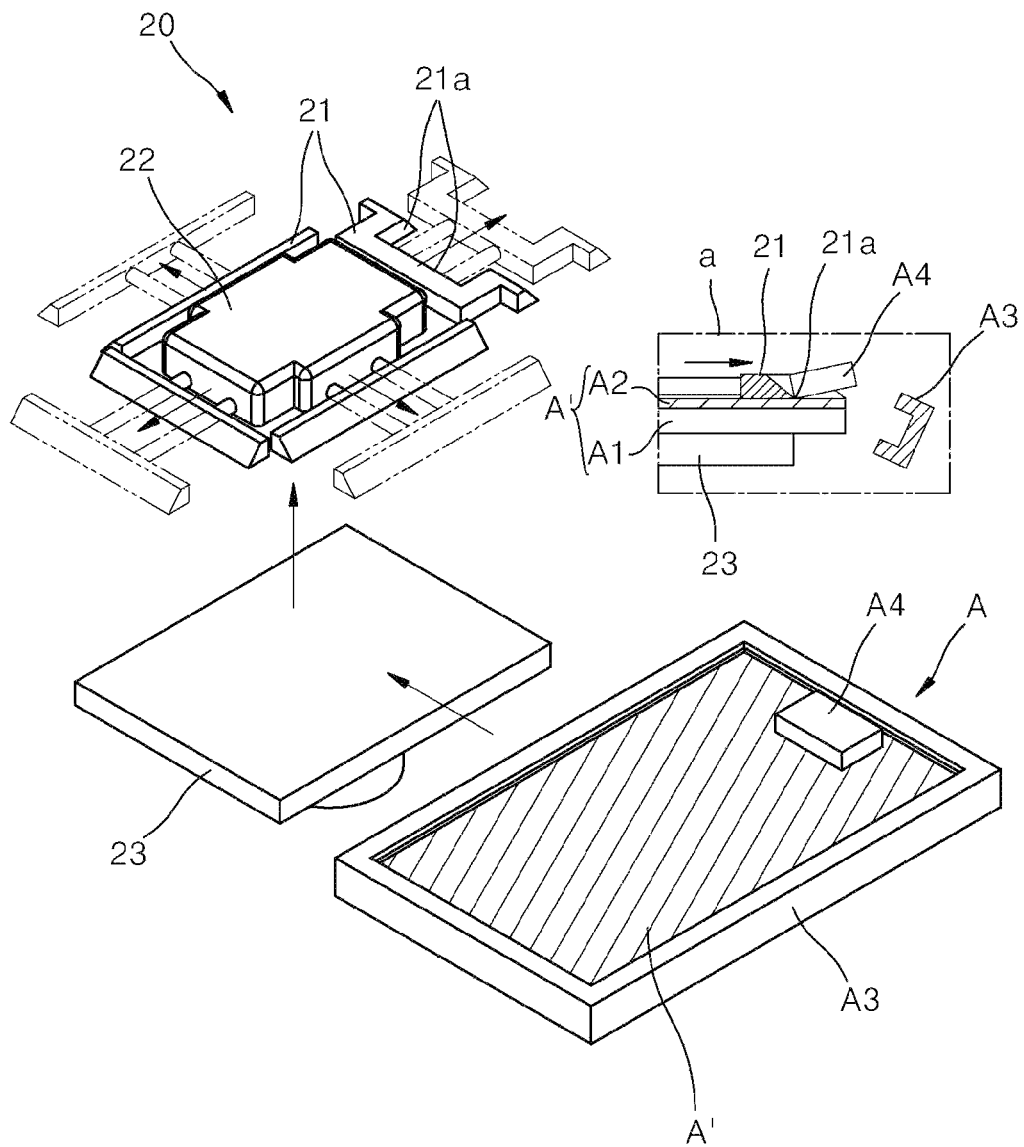
FIG. 8 is a view exemplifying the structure and operation of a frame separator of the solar module disassembling apparatus shown in FIG. 6.
Figure 9:
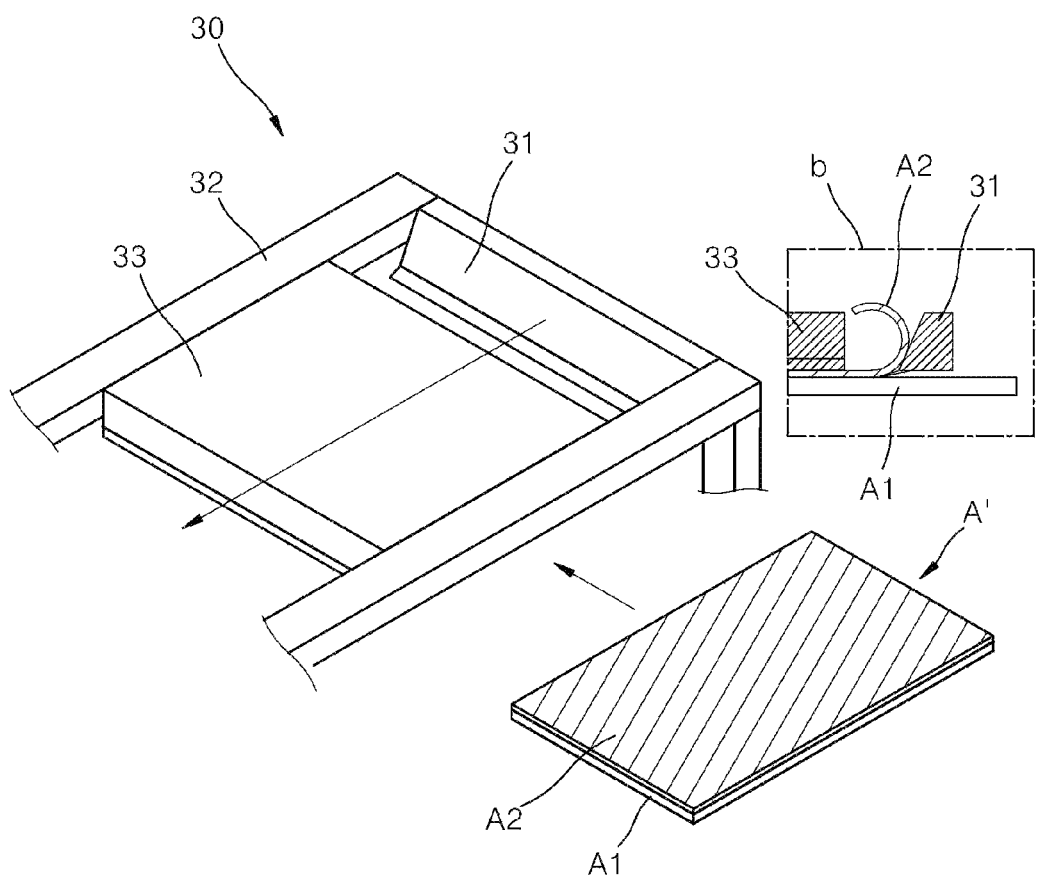
FIG. 9 is a view exemplifying the structure and operation of disassembler of the solar module disassembling apparatus shown in FIG. 6.

FIG. 6 is a conceptual diagram of a solar module disassembling apparatus according to an embodiment of the present disclosure, FIG. 7 is a view showing a modification of the solar module disassembling apparatus shown in FIG. 6, FIG. 8 is a view exemplifying the structure and operation of a frame separator of the solar module disassembling apparatus shown in FIG. 6, and FIG. 9 is a view exemplifying the structure and operation of disassembler of the solar module disassembling apparatus shown in FIG. 6. In FIGS. 8 and 9, the boxes 'a' and 'b' are cross-sectional views showing the operation of a frame separator and a disassembler.

Referring to FIG. 6, the solar module disassembling apparatus 1 according to the present disclosure includes: the solar module lifting apparatus 10 of the present disclosure described above; and a solar module disassembling unit that is supplied with a solar module A from the solar module lifting apparatus 10 and disassembles the solar module A into parts including a glass plate A1 (see FIG. 9) included in the solar module, a stacked film A2 (see FIG. 9) having a solar cell stacked on the glass plate, and a frame A3 (see FIG. 8) surrounding a module body A' (see FIGS. 8 and 9) comprised of the glass plate and the stacked film. The solar module disassembling unit includes: a frame separator 20 including a frame separation blade 21 (see FIG. 8) that presses and separates the frame A3 from the module body A', receiving a solar module from one side, separating a frame, and discharging a module body from the other side; and a disassembler 30 including a scraper 31 (see FIG. 9) that scrapes the stacked film from the glass plate, receiving a module body from one side, and disassembling and discharging the module body into a stacked film and a glass plate. That is, the solar module disassembling unit may include a frame separator 20 and a disassembler 30.

The solar module disassembling unit may be configured entirely in a movable type including a movable container unit 40, as in the present embodiment. That is, the solar module disassembling unit, as shown in FIGS. 6 and 7, may further include a movable container unit 40 that is moved with the frame separator 20 and the disassembler 30 therein, and the solar module lifting apparatus 10 can move up and supply a solar module A into the movable container unit 40 at the outside of the movable container unit 30. The solar module disassembling apparatus 1 of the present disclosure is described hereafter in more detail with reference to an embodiment of the present disclosure.

First, the structure of a solar module A that is the target to be disassembled by the present disclosure is briefly described (with reference to FIGS. 8 and 9). The solar module A may be formed by integrating a plurality of solar cells and may include a protector for integrating and protecting the solar cells. The solar module A may include a glass plate A1, a stacked film A2 including a solar cell stacked on the glass plate A1, and a frame A3 surrounding a module body A' including the glass plate A1 and the stacked film A2. The frame A3 may be a metallic structure and may be an aluminum bar, etc. The frame A3 can serve to surround and protect the module body A'. The glass plate A1, which is disposed on the front surface (i.e., a light-incident surface) of the solar module A in actual use, can serve to prevent the stacked film A2 from being contaminated and keep the shape of the stacked film A2. The solar cell may be included in the stacked film A2, and the stacked film A2 may, in addition to the solar cell, include an encapsulation film, a back sheet, etc. that are disposed on both sides of the solar cell. A junction box A4 may protrude from the outer surface (i.e., the rear surface opposite to the light-incident surface) of the stacked film A2 for cable connection, etc.

Referring to FIG. 6, the movable container unit 40 of the solar module disassembling apparatus 1 of the present disclosure can be moved, so the entire apparatus can be moved with the movable container unit 40. Accordingly, it is possible to move to a solar photovoltaic power generation facility where the solar modules A are installed in a large scale, etc., and can immediately dispose of waste solar modules A. The movable container unit 40 is hollow, can be moved by itself or by external power, and has at least one door 41 being able to expose the inside by opening and closing. The movable container unit 40 may be a box-shaped structure mounted with a movable structure such as wheels, but is not limited thereto and may be formed in various movable structures. For example, the movable container unit 40 may be formed in a structure in which a movable frame with wheels and a box-shaped container are separably combined, or may include container of another shape rather than a simple box shape. The number of the container may be changed into one or more. The movable container unit 40, for example, may be a trailer that is connected to a tractor (including a semi-trailer and a full-trailer) or may be an assembly of a tractor and a trailer. The movable container unit 40 may be provided with power for moving from the outside or may have a driving unit and move by itself.

The frame separator 20 and the disassembler 30 are sequentially disposed in the movable container unit 40. The frame separator 20 and the disassembler 30 are connected by an internal rail or an internal conveyer, whereby the process of disassembling solar modules is continuously performed. As shown in FIGS. 6 and 7, the solar module lifting apparatus 10 moves up and supplies a solar cell A into the movable container unit 40 at the outside of the movable container unit 40. The solar module lifting apparatus 10 can be formed in a movable type by coupling wheels, etc. to the base 100 described above (see FIGS. 1 to 5). The solar module lifting apparatus 10 can very smoothly supply the solar module A into the movable container unit 40 positioned higher than the ground by moving up/down and rotating the rotary supply plate 300 described above (see FIGS. 1 to 5). The solar module A loaded on the solar module lifting apparatus 10 can be moved up while being rotated, and can be supplied into the movable container unit 40 horizontally by changing the arrangement. In particular, when the solar module disassembling apparatus 1 is configured in a movable type and performs disposal outdoors, for example, it may be required to carry the solar module A in an erect state or to load and carry the waste solar module A lengthwise on a rack due to an uneven ground, etc., and it is required to rotate back to horizontal direction and then put the waste solar module A into the process. The solar module lifting apparatus 10 can effectively deal with this situation by operating in the way described above.

As shown in FIG. 7, the movable container unit 40 includes a plurality of floors 40*a* and 40*b* therein, and the solar module lifting apparatus 10 can move up and supply the solar module A onto any one of the floors 40*a* and 40*b*. The movable container unit 40 can be configured in a multi-floor type, if necessary, using the internal space, and in this case, a process line can be positioned relatively high from the ground. Since the solar module lifting apparatus 10 not only can move up and down the rotary supply plate 300, but can substantially adjust the height using the leveling module 110 (see FIGS. 1 to 5) described above, it is possible to conveniently put a solar module A (horizontally) into the higher floor 40*b*, as show in the figures, by combining these functions. Accordingly, it is possible to solve problems related to supply of solar modules A in various situations, using the solar module lifting apparatus 10. As described above, a solar module A supplied by the solar module lifting apparatus 10 can be completely disassembled into parts through the frame separator 20 and the disassembler 30. A disassembling process is described hereafter in more detail with reference to FIGS. 8 and 9. As described above, in FIGS. 8 and 9, the boxes 'a' and 'b' are cross-sectional views showing the operation of a frame separator and a disassembler.

Referring to FIG. 8, a solar module A put in the movable container unit is first processed by the frame separator 20. The frame separator 20, as described above, is disposed in the movable container unit 40, includes a frame separation blade 21 pressing and separating the frame A3 from the module body A', is supplied with the solar module A from one side, and discharges the module body A' from the other side after separating the frame A3. The discharged module body A' is supplied to the disassembler 30 (see FIG. 9). The frame separator 20 may include a position adjustment plate 23 that adjusts the vertical position of the solar module A supplied from one side by supporting at the bottom and moving up and down the solar module A such that the frame separation blade 21 and the frame A3 at least partially cross each other. Accordingly, the solar module A is supplied first to the position adjustment plate 23 and then the position adjustment plate 23 is moved up, thereby bringing the solar module A in contact with the frame separation blade 21. The frame separation blade 21 can press and separate the frame A3 and may be changed to various shapes within the purpose. Accordingly, the blade is not limited to the shape shown in the figures. The frame separation blade 21 may be formed to be acute at the end, and if necessary, it may be changed to various shapes.

Preferably, a plurality of frame separation blades 21 may be provided to correspond to the frame A3 disposed in a rectangular shape around the solar module A. For example, at least four frame separation blades 21 may be provided, as shown in the figure, to correspond to the sides of a rectangle, respectively. Each of the frame separation blades 21 may be coupled to a cylinder, which is operated by hydraulic pressure, to be operated, and an actuator 22 may include the cylinders. The actuator 22 shown in the figures is conceptual, so it is not limited thereto. Though not shown in the figures, a support frame supporting the actuator 22 may be disposed outside. The position adjustment plate 23 may also be coupled to a cylinder, which is operated by hydraulic pressure, to be vertically operated, and a fluid controller that supplies and controls hydraulic pressure to the cylinder may be disposed at an appropriate position around the frame separator 20. However, various structures that can apply pressure in the motion direction through a straight motion other than the cylinder structure may be applied as the actuating structure. It is possible to operate the frame separation blade 21 and the position adjustment plate 23 using various actuating structures.

In particular, a plurality of frame separation blades 21 may expand out of the frame A3 from the inside of the frame A3 and may press different surfaces of the frame A3, and at least one of the blades may have a recessed groove 21*a* recessed inward on the blade surface. The frame separation blades 21 can keep the junction box A4 attached to the outer surface of the stacked film A2 in the recessed groove 21*a* and separate the junction box A4 together with the frame A3. For example, four frame separation blades 21 can contract as close to the actuator 220 as possible by moving toward the actuator 22 (in this state, the four frame separation blades all may be positioned inside the frame) and can expand outward as shown in the figures after the position adjustment plate 23 loads and moves up the solar module A (accordingly, after the frame surrounds the outer sides of the four frame separation blades) to separate the frame A3 by pressing different surfaces of the frame A3. The recessed groove 21*a* may be formed at at least any one of the frame separation blades 21 and may be formed by bending or cutting a portion of the frame separation blade 21. It is also possible to form a blade at an end in the recessed groove 21*a* by acutely machining the end.

According to this structure, it is possible to separate the frame A3 and the junction box A4 first from the waste solar module A. The solar module A may be supplied with the front surface having the glass plate A1 thereon faced down, and accordingly, the glass plate A1 can be positioned at the lowermost bottom, the stacked film A1 can be positioned thereon, and the stacked film A2 can be surrounded by the frame A3. The junction box A4 protrudes from the top in the figure, which is the rear surface of the solar module A. The solar module A is put on the position adjustment plate 23 and moved up, whereby the vertical position thereof is adjusted. Since the frame A3 protrudes widely up and down further than the module body A' to surround the module body A', as shown in the box 'a' at the center in FIG. 8, when the frame separation blades 21 come in contact with the module body A', the frame can at least partially cross the frame separation blades 21. Accordingly, when the frame separation blades 21 expand outward, the frame A3 is disassembled by pressure. The frame A3 may be formed by bonding four bars, and the joints of the bars are forced to be separated, whereby the frame A3 can be disassembled.

The frame separation blade 21 having the recessed groove 21*a* simultaneously presses the junction box A4 and the frame A3 while keeping the junction box A4 in the recessed groove 21*a*, as shown in the box 'a'. Accordingly, the junction box A4 and the frame A3 can be simultaneously disassembled. The frame separation blade 21 having the recessed groove 21*a* may have a structure that can come in contact with the frame A3 at another portion rather than the recessed groove 21*a* while keeping the junction box A4. This structure, for example, may be a structure in which a portion of a blade symmetrically extends to both sides from the end of the recessed groove 21*a*. According to this structure, it is possible to remarkably reduce the disassembling time and simplify the process by simultaneously disassembling the junction box A4 and the frame A3.

When the frame A3 and the junction box A4 are disassembled, the remaining module body A' is supplied to the disassembler 30 and disassembled, as shown in FIG. 9. Referring to FIG. 9, the module body A' is supplied to the disassembler 30 and disassembled into the stacked film A2 and the glass plate A1. The disassembler 30 includes the scraper 31 configured to scrape and separate the stacked film A2 from the glass plate A1, is supplied with the module body A' from one side, and disassembles and discharges the module body A' into the stacked film A2 and the glass plate A1. The disassembler 30 may include: a guide bar 32 that is disposed in parallel with the glass plate A1 and to which the scraper 31 is movably coupled; and a moving heating plate 33 that is movably coupled to the front of the scraper 31 of the guide bar 32 and separates at least a portion of the stacked film A2 from the glass plate A1 by heating the stacked film A2 ahead of the scraper 31. The guide bar 32 determines the movement direction of the scraper 31 and the moving heating plate 33 and is briefly shown in the figures. A driving unit that straightly actuates the scraper 31 and the moving heating plate 33 may be disposed on or in parallel with the guide bar 32. The driving unit may include a cylinder that is operated by hydraulic pressure, etc. However, the present disclosure is not limited thereto and it is possible to move them using various driving units that can apply pressure in the motion direction by straightly moving.

The scraper 31 has an acute blade at the bottom to be able to easily enter between the glass plate A1 and the stacked film A2. Though not shown, the scraper 31 itself may have a heater that applies heat to scrape the stacked film A2 in a heated state. The lower end of the moving heating plate 33 may be slightly spaced not to completely come in contact with the module body A', and a heating structure that applies heat to the module body A' may be formed at the lower end. The heating structure is not necessarily limited thereto, but for example, may be formed to heat the top (i.e., the stacked film) of the module body A' using hot wind and/or radiation heat. Accordingly, it is possible to more easily scrape and separate the stacked film A2 from the glass plate A1 at the rear portion using the scraper 31 while bending the stacked film A2 ahead of the scraper 31 using heat.

Accordingly, the module body A' can be disassembled as follows. The disassembler 30 can scrape the stacked film A2, as shown in the box 'b' at the center in FIG. 9, while moving the moving heating plate 33 and the scraper 31 in the longitudinal direction of the module body A' supplied therein. The moving heating plate 33 that moves ahead can heat the stacked film A2 first and separate a portion of the stacked film A2 from the glass plate A1 (by bending using heat), and the scraper 31 can move behind the moving heating plate and can completely remove the stacked film A2. The moving heating plate 33 can also prevent excessive deformation by partially coming in contact with the stacked film A2 bent by heat, and the gap between the moving heating plate 33 and the scraper 31 may be adjusted such that the shape can be maintained by elasticity of the stacked film A2. Accordingly, the moving heating plate 33 appropriately flattens ahead the stacked film A2 and the scraper 31 can more easily separate the stacked film A2 while following the moving heating plate. As described above, when the stacked film A2 is scraped and separated from the glass plate A1, the glass plate A1 and the stacked film A2 are disassembled, whereby the solar module is completely disassembled into the parts.

Accordingly, a solar module can be completely disassembled into the parts of the frame, junction box, glass plate, and stacked film described above through the disassembling process. The frame and the module body are separately discharged, and the glass plate and the stacked film separated from each other can also be discharged through different paths. The discharge process can also be automatically performed using an appropriate conveyer structure of discharge. The stacked film A2 may be discharged, for example, while being rolled during scraping. This disassembling process is continuously performed, whereby it is possible to dispose of several solar modules without a problem.

According to the present disclosure, it is possible to very conveniently carry a solar module in a situation that conveyers, roller, etc. of the related art is difficult to be applied. For example, it is possible to effectively solve problems by applying the present disclosure in various problematic situations such as where it is difficult to apply a conveyer, etc. because a process line is positioned higher than the ground, where a solar module has to be horizontally positioned during a process because the solar module is loaded lengthwise, or where it is difficult to convey a solar module simply using a conveyer, etc. because the ground is not even, and accordingly, it is possible to more stably supply a solar module. In particular, since the solar module lifting apparatus of the present disclosure can carry a solar module while automatically adjusting not only the height, but also the arrangement of the solar module through a combined operation that changes the inclination when moving up and down, there is an effect that a process is simplified, the manpower is also reduced, and the work efficiency is also generally increased. Further, it is possible to easily disassemble each of solar modules into parts using the solar module disassembling apparatus of the present disclosure while being supplied with solar modules.

Although exemplary embodiments of the present disclosure were described above with reference to the accompanying drawings, those skilled in the art would understand that the present disclosure may be implemented in various ways without changing the necessary features or the spirit of the prevent disclosure. Therefore, the embodiments described above are only examples and should not be construed as being limitative in all respects.

What is claimed is:

1. A solar module lifting apparatus comprising:
   a base configured to be supported on the ground;
   a cylinder module including a plurality of cylinder units that is disposed on the base and changes in height by contracting and stretching; and
   a rotary supply plate having one side that supports a solar module and the other side that is coupled to the cylinder module, and moving up and down the solar module by operation of the cylinder module,
   wherein the rotary supply plate includes a first hinge and a second hinge spaced apart from each other on the other side, the cylinder module includes a first cylinder unit and a second cylinder unit of which the upper ends are coupled to the first hinge and the second hinge by shafts, respectively; and
   at least one of the height and the inclination of the rotary supply plate is adjusted by contracting or stretching of the first cylinder unit and the second cylinder unit,
   wherein the base includes a top plate and a bottom plate, and a leveling module disposed between the top plate and the bottom plate, the leveling module being configured to change a reference position of the cylinder module by changing a gap between the top plate and the bottom plate;

the rotary supply plate includes a first hinge and a second hinge spaced apart from each other on the other side, and a holding step protruding perpendicularly to the rotary supply plate from a distal end of the rotary supply plate, the holding step configured to support an edge of the solar module and prevent disengagement due to centrifugal force during rotation;

the first cylinder unit and the second cylinder unit have upper ends coupled by shafts to the first hinge and the second hinge, respectively;

a contracting-stretching distance of the first cylinder unit is larger than a contracting-stretching distance of the second cylinder unit;

the second cylinder unit has a lower end coupled by a shaft to a level block formed at an upper portion of the base, such that the second cylinder unit is positioned higher than the first cylinder unit from the ground;

the center of gravity of the rotary supply plate is positioned between the first hinge and the second hinge, and the first cylinder unit and the second cylinder unit change the heights of the first hinge and the second hinge in opposite directions;

a center of gravity of the rotary supply plate is positioned between the first hinge and the second hinge;

the first cylinder unit and the second cylinder unit are adapted to change the heights of the first hinge and the second hinge in opposite directions;

whereby, after the solar module is loaded in an inclined state on the rotary supply plate, actuation of the cylinder module allows the rotary supply plate to move from a first arrangement, in which the first hinge is lower than the second hinge and the rotary supply plate is inclined, to a second arrangement in which the first hinge is not lower than the second hinge, such that the rotary supply plate rotates and simultaneously ascends, so that, by changing both the rotation relative to and the height of the center of gravity of the rotary supply plate, the solar module can be transported to a destination higher than the ground with a changed alignment direction.

2. The solar module lifting apparatus of claim 1, wherein the holding step protrudes perpendicularly to the rotary supply plate from the lowermost end of the rotary supply plate in the first arrangement.

3. The solar module lifting apparatus of claim 1, wherein an inclination of the second cylinder unit is configured to change.

4. A solar module disassembling apparatus comprising:
the solar module lifting apparatus of claim 1; and
a solar module disassembling unit that is supplied with the solar module from the solar module lifting apparatus and disassembles the solar module into parts including a glass plate included in the solar module, a stacked film having a solar cell stacked on the glass plate, and a frame surrounding a module body comprised of the glass plate and the stacked film, the solar module disassembling unit comprising:
a frame separator comprising a frame separation blade that presses and separates the frame from the module body, receiving the solar module from one side, separating the frame, and discharging the module body from the other side; and
a disassembler comprising a scraper that scrapes the stacked film from the glass plate, receiving the module body from one side, and disassembling and discharging the module body into the stacked film and the glass plate.

5. The solar module disassembling apparatus of claim 4, wherein the solar module disassembling unit further comprises a movable container unit configured to be moved with the frame separator and the disassembler therein, and the solar module lifting apparatus moves up and supplies the solar module into the movable container unit at the outside of the movable container unit.

6. The solar module disassembling apparatus of claim 5, wherein the movable container unit has a plurality of floors therein, and the solar module lifting apparatus moves up and supplies the solar module onto any one of the floors.

* * * * *